(12) United States Patent
Hamada et al.

(10) Patent No.: US 10,055,844 B2
(45) Date of Patent: Aug. 21, 2018

(54) DISEASE DIAGNOSTIC APPARATUS, IMAGE PROCESSING METHOD IN THE SAME APPARATUS, AND MEDIUM STORING PROGRAM ASSOCIATED WITH THE SAME METHOD

(71) Applicant: CASIO COMPUTER CO., LTD., Shibuya-ku, Tokyo (JP)

(72) Inventors: Akira Hamada, Sagamihara (JP); Mitsuyasu Nakajima, Tokyo (JP); Masaru Tanaka, Tokyo (JP); Toshitsugu Sato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/800,555

(22) Filed: Nov. 1, 2017

(65) Prior Publication Data

US 2018/0068444 A1 Mar. 8, 2018

Related U.S. Application Data

(62) Division of application No. 14/860,581, filed on Sep. 21, 2015, now Pat. No. 9,836,836.

(30) Foreign Application Priority Data

Nov. 7, 2014 (JP) .................................. 2014-227526

(51) Int. Cl.
*G06T 7/00* (2017.01)
*G06T 5/00* (2006.01)
*G06T 7/11* (2017.01)

(52) U.S. Cl.
CPC ............ *G06T 7/0012* (2013.01); *G06T 5/004* (2013.01); *G06T 7/11* (2017.01);
(Continued)

(58) Field of Classification Search
None
See application file for complete search history.

(56) References Cited

U.S. PATENT DOCUMENTS 5,241,468 A * 8/1993 Kenet .................. A61B 5/0059
382/128
7,720,266 B2 * 5/2010 Ni ........................ G01S 7/52034
378/37
(Continued)

FOREIGN PATENT DOCUMENTS

JP 63173182 A 7/1988
JP 2005192944 A 7/2005
(Continued)

OTHER PUBLICATIONS

Shi Haiyan et al ("An integrated bilateral and unsharp masking filter for image contrast enhancement", 2013).*
(Continued)

*Primary Examiner* — Avinash Yentrapati
(74) *Attorney, Agent, or Firm* — Holtz, Holtz & Volek PC

(57) ABSTRACT

A diagnostic apparatus for diagnosing a disease using a captured image of an affected area, the apparatus including a memory configured to memorize the captured image; and a processor configured to process the memorized image memorized in the memory. The processor is configured to perform a highlighting process which includes separating the captured image into the brightness component and a color information component; separating the brightness component into a base component and a detail component; highlighting the separated brightness component; and adding a region to be diagnosed in the captured image to the highlighted brightness component while a specified color of the region to be diagnosed is maintained.

10 Claims, 9 Drawing Sheets

(52) U.S. Cl.
CPC ............... *G06T 2207/10024* (2013.01); *G06T 2207/10056* (2013.01); *G06T 2207/20028* (2013.01); *G06T 2207/30088* (2013.01); *G06T 2207/30096* (2013.01); *G06T 2207/30101* (2013.01)

(56) References Cited

U.S. PATENT DOCUMENTS

| | | | | |
|---|---|---|---|---|
| 8,406,482 | B1* | 3/2013 | Chien | G06K 9/4652 382/115 |
| 2002/0176623 | A1* | 11/2002 | Steinberg | G06K 9/00228 382/165 |
| 2003/0002736 | A1* | 1/2003 | Maruoka | G06T 5/009 382/168 |
| 2004/0151356 | A1* | 8/2004 | Li | G06K 9/527 382/131 |
| 2004/0190789 | A1* | 9/2004 | Liu | G06T 5/009 382/274 |
| 2004/0212815 | A1* | 10/2004 | Heeman | G06T 11/001 358/1.9 |
| 2005/0083347 | A1* | 4/2005 | Wilensky | G06T 5/003 345/606 |
| 2006/0093213 | A1* | 5/2006 | Steinberg | G06K 9/0061 382/167 |
| 2007/0080975 | A1* | 4/2007 | Yamashita | G09G 5/04 345/591 |
| 2007/0211959 | A1* | 9/2007 | Hayaishi | G06K 9/00234 382/274 |
| 2007/0237418 | A1* | 10/2007 | Toyoda | G06T 5/008 382/260 |
| 2008/0080766 | A1* | 4/2008 | Payonk | A45D 44/005 382/167 |
| 2008/0144962 | A1 | 6/2008 | Jung et al. | |
| 2008/0260218 | A1 | 10/2008 | Smith et al. | |
| 2008/0275315 | A1* | 11/2008 | Oka | A61B 5/0059 600/306 |
| 2009/0034824 | A1 | 2/2009 | Li et al. | |
| 2009/0161953 | A1* | 6/2009 | Ciurea | H04N 1/4074 382/172 |
| 2010/0158330 | A1* | 6/2010 | Guissin | G06K 9/00369 382/128 |
| 2010/0195901 | A1* | 8/2010 | Andrus | H04N 5/213 382/162 |
| 2011/0096201 | A1* | 4/2011 | Yoo | G06T 5/007 348/235 |
| 2012/0301024 | A1 | 11/2012 | Yuan et al. | |
| 2013/0279776 | A1 | 10/2013 | Guissin et al. | |
| 2014/0285641 | A1 | 9/2014 | Kato et al. | |
| 2015/0213619 | A1* | 7/2015 | Nakamura | A61B 5/0077 382/128 |
| 2015/0339817 | A1* | 11/2015 | Kuriyama | G06T 1/0007 348/71 |
| 2015/0379712 | A1 | 12/2015 | Guissin et al. | |
| 2016/0014328 | A1 | 1/2016 | Rokutanda | |
| 2016/0133009 | A1 | 5/2016 | Hamada et al. | |
| 2016/0133010 | A1 | 5/2016 | Hamada et al. | |
| 2016/0133011 | A1 | 5/2016 | Nakajima | |

FOREIGN PATENT DOCUMENTS

| | | |
|---|---|---|
| WO | 2007031946 A2 | 3/2007 |
| WO | 2014027522 A1 | 2/2014 |
| WO | 2014057618 A1 | 4/2014 |
| WO | 2014119047 A1 | 8/2014 |
| WO | 2014155782 A1 | 10/2014 |
| WO | 2014172671 A1 | 10/2014 |

OTHER PUBLICATIONS

Communication pursuant to Article 94(3) EPC dated Apr. 26, 2017, issued in counterpart European Application No. 15186631.6.
European Office Action (in English) dated Apr. 19, 2017 issued in counterpart European Application No. 15186620.9.
European Office Action (in English) dated Apr. 19, 2017 issued in counterpart European Application No. 15186621.7.
Extended European Search Report (EESR) dated Apr. 19, 2017 issued in counterpart European divisional Application No. 16203645.3.
Extended European Search Report dated Apr. 20, 2016, issued in counterpart European Application No. 15186620.9.
Extended European Search Report dated Apr. 26, 2016, issued in counterpart European Application No. 15186631.6.
Extended European Search Report dated May 11, 2016, issued in counterpart European Application No. 15186621.7.
Japanese Office Action (and English translation thereof) dated Aug. 1, 2017 issued in counterpart Japanese Application No. 2016-124922.
Japanese Office Action (and English translation thereof) dated Jul. 29, 2016, issued in counterpart Japanese Application No. 2014-227530.
Japanese Office Action (and English translation thereof) dated May 31, 2016, issued in counterpart Japanese Application No. 2014-227526.
Japanese Office Action (and English translation thereof) dated May 31, 2016, issued in counterpart Japanese Application No. 2014-227527.
Japanese Office Action (and English translation thereof) dated May 31, 2016, issued in counterpart Japanese Application No. 2014-227528.
Japanese Office Action (and English translation thereof) dated May 31, 2016, issued in counterpart Japanese Application No. 2014-227530.
Toshitsugu Sato, et al., "Improved Detection of Dermoscopic Structures by High Dynamic Range Image Conversion", Japanese Journal of Dermatology, vol. 123, No. 2, Feb. 2013, pp. 121-131.
Yandow-Reilly, et al., "Unsupervised Skin Lesion Classification and Matching", RIT Scholar Works, Feb. 1, 2003, pp. 1-48, XP055261424.
Shenton, et al., "Harvard Brain Atlas: a Teaching and Visualization Tool", Biomedical Visualization, Oct. 30, 1995. IEEE Computer Society, pp. 10-17, 81, XP010196687.
U.S. Appl. No. 14/860,581; First Named Inventor: Akira Hamada; Title: "Disease Diagnostic Apparatus, Image Processing Method in the Same Apparatus, and Medium Storing Program Associated With the Same Method"; filed Sep. 21, 2015.
U.S. Appl. No. 14/860,603; First Named Inventor: Akira Hamada; Title: "Disease Diagnostic Apparatus, Image Processing Method in the Same Apparatus, and Medium Storing Program Associated With the Same Method"; filed Sep. 21, 2015.
U.S. Appl. No. 14/860,618; First Named Inventor: Mitsuyasu Nakajima; "Disease Diagnostic Apparatus, Image Processing Method in the Same Apparatus, and Medium Storing Program Associated With the Same Method"; filed Sep. 21, 2015.
Bovik, et al., "Handbook of Image and Video Processing", Jan. 1, 2000, AP, pp. 26-27 and 95-97, XP 002756272.
Cheng, et al., "Adaptive synthetic aperture radar image enhancement", SPIE—International Society for Optical Engineering. Proceedings, vol. 7494, Oct. 30, 2009 (Oct. 30, 2009), p. 749426.
Fischer, "Analysis of Skin Lesions with Pigmented Networks", Proceedings of the international conference in image processing (ICIP) Lausanne, Sep. 16-19, 1996: vol. 1, pp. 323-326, XP002381197.

(56) References Cited

OTHER PUBLICATIONS

Haiyan, et al., "An Integrated Bilateral and Unsharp Masking Filter for Image Contrast Enhancement", 2013 International Conference on Machine Learning and Cybernetics, IEEE, vol. 2, Jul. 14, 2013, pp. 907-912, XP032637586.

Koehler, et al., "Non-invasive imaging techniques in the diagnosis of skin diseases", Expert Opinion on Medical Diagnostics, Informa Healthcare, UK, vol. 5, No. 5, Sep. 1, 2011, pp. 425-440, XP009171403.

* cited by examiner

DISEASE DIAGNOSTIC APPARATUS, IMAGE PROCESSING METHOD IN THE SAME APPARATUS, AND MEDIUM STORING PROGRAM ASSOCIATED WITH THE SAME METHOD

CROSS-REFERENCE TO RELATED APPLICATIONS

This application is a Divisional application of U.S. Ser. No. 14/860,581, filed Sep. 21, 2015, which claims priority from Japanese Patent Application No. 2014-227526, filed Nov. 7, 2014, the entire contents of both of which are incorporated herein by reference.

TECHNICAL FIELD

The present invention relates to a disease diagnostic apparatus, an image processing method in the same apparatus, and a medium storing a program associated with the same method.

BACKGROUND ART

Generally, visual inspection is necessarily performed to diagnose a cutaneous legion, thereby obtaining an amount of information. However, not only discrimination between a mole and a spot but also discrimination between a benign tumor and a malignant tumor are substantially difficult with a naked eye inspection and even a magnifying glass inspection. For the reasons, dermoscopic inspection in which a dermoscope-equipped camera is used to capture an image of a disease has been conventionally performed.

The dermascope is a noninvasive diagnostic device in which a disease irradiated with light from, for example, a halogen lamp, and unobstructed by reflective light due to echo gel or a polarization filter is magnified (typically ×10) and subjected to observation. A dermoscopic diagnosis can be defined as the inspection of skin diseases with the dermoscope. For more detail, see internet URL (http://www.twmu.ac.jp/DNH/department/dermatology/dermoscopy.html) (accessed on Sep. 1, 2014). In accordance with the dermoscopic diagnosis, scattered reflection occurring due to a cuticle is eliminated, thereby rendering the distribution of pigmentation from an epidermis to a superficial intradermal layer increasingly visible.

For example, Patent Literature 1 (Japanese patent publication No. 2005-192944 (A)) discloses technologies of a remote diagnosis apparatus of diagnosing a pigmented skin disease employing a value such as color, a texture, an asymmetricity, and a circularity based on an image of a skin captured by the dermoscope. In accordance with Patent Literature 1, a portable phone provided with a dermoscope-equipped camera is used, and an image of a skin having a disease of a benign nevus pigmentosus and etc. and having a risk of a melanoma is captured by the dermoscope. The portable phone is connected to an internet due to its network connecting function, and the image of the skin captured is transmitted via the internet to the remote diagnosis apparatus to request a diagnosis. Upon receiving the image of the skin based on the request, the remote diagnosis apparatus uses a melanoma diagnosis program to determine whether based on the image of the skin the disease is a melanoma or not, or in a case where the disease is the melanoma, which stage of the melanoma is. The determination as a result is transmitted to a physician having requested the diagnosis.

While diagnosis that is performed based on the aforementioned dermoscopic image has become widely used, clear shape change or feature is often difficult to obtain. In addition, an observation of the image and a determination of a disease actually depend on a skill of a physician or clinician. For the reasons, a tool allowing for easy and accurate diagnosis based on image processing technologies of, for example, highlighting a disease portion in the dermoscopic image, has been desired.

CITATION LIST

Patent Literature

[Patent Literature 1] Japanese patent publication No. 2005-192944 (A)

SUMMARY OF INVENTION

In accordance with a first aspect of the invention, there is provided a method of processing an image in a diagnostic apparatus of diagnosing a disease using a captured image of an affected area, comprising: a memorizing step of memorizing the captured image, and a processing step of processing the captured image memorized, wherein in the processing step a region to be diagnosed is subjected to a highlighting process with a specified color thereof maintained.

In accordance with a second another aspect of the invention, there is provided with a diagnostic apparatus of diagnosing a disease using a captured image of an affected area, comprising: an image-memorizing unit configured to memorize the captured image; and a processing unit configured to process the captured image memorized in the image-memorizing unit, the processing unit comprising a highlighting means configured to highlight a region to be diagnosed while maintaining a specified color of the region.

In accordance with a third aspect of the invention, there is provided a non-transitory computer readable medium storing a program of processing an image in a diagnostic apparatus of diagnosing a disease using a captured image of an affected area, the program causing a computer to execute: a memorizing step of memorizing the captured image, and a processing step of processing the captured image memorized, comprising subjecting a region to be diagnosed to a highlighting process while maintaining a specified color of the region.

DESCRIPTION OF EMBODIMENTS

Figure 1:
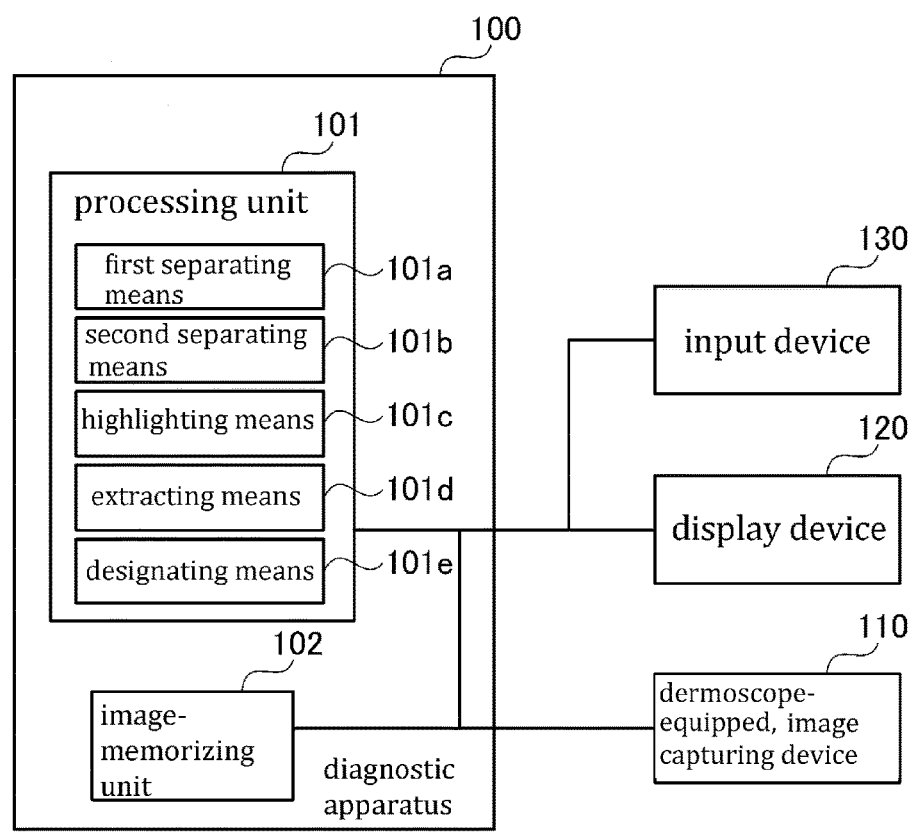
FIG. 1 is a block diagram showing a configuration of one embodiment of a diagnostic apparatus in accordance with the present invention.

Referring to the accompanying drawings, an embodiment of the invention will be hereinafter described in detail. Furthermore, the same reference numeral is assigned to the same element or part throughout the overall specification.

Configuration of Embodiment

FIG. 1 is a block diagram showing a configuration of a diagnostic apparatus 100 in accordance with one embodiment of the present invention. Referring to FIG. 1, an image-capturing device 110 equipped with a dermoscope, which can be hereinafter designated as an "image-capturing device 110" or "dermoscope-equipped, image-capturing device 110" throughout the specification, is connected to the diagnostic apparatus 100. The dermoscope-equipped, image-capturing device 110 is configured to capture an image of an affected area in accordance with an instruction from the diagnostic apparatus 100 (in particular, a processing unit 101), memorize the captured image such as a dermoscopic image in an image-memorizing unit 102, and display the captured image on a predetermined area of a display device 120. Furthermore, the captured image is highlighted by the processing unit 101, and then memorized in the image-memorizing unit 102 and displayed on the predetermined area of the display device 120. An input device 130 is configured to perform an instruction for starting to capture an image such as a dermoscopic image, and selection of a region in the dermoscopic image, which will be described below.

The display device 120 may be a LCD (Liquid Crystal Display) monitor, and the input device 130 may be a mouse.

The processing unit 101 is configured to process the captured image such as the dermoscopic image, of the affected area as memorized in the image-memorizing unit 102. Referring to FIG. 1, the processing unit 101 has first separating means 101*a*, second separating means 101*b*, highlighting means 101*c*, extracting means 101*d*, and designating means 101*e*.

The first separating means 101*a* function as means for separating the captured image into a brightness component and a color information component. The second separating means 101*b* function as means for separating the brightness component into a base component (also called a large-scale component) and a detail component. The term "base component" means a brightness component having globally-varying properties in the specification statistically, and the term "detail component" means the bright component having locally-varying properties in the specification statistically.

The highlighting means 101*c* function as means for performing highlight process on the base component and the detail component in a different manner. The extracting means 101*d* function as means for extracting a region selected as an object to be diagnosed, based on a color information of a specified color. The designating means 101*e* function as means for variably designating a degree of maintaining the specified color of the region depending on contrast strength. The highlighting means 101*c* may highlight a red-based color component as the color information component of the specified color, and in this case the extracting means 101*d* extract the selected region as a vessel-corresponding region based on the red-based color component. Furthermore, the highlighting means 101*c* may highlight a blue-based color component as the color information component of the specified color, and in this case the extracting means 101*d* extract the selected region as a basal cell cancer-corresponding region based on the blue-based color component.

Each of the first separating means 101*a*, the second separating means 101*b*, the highlighting means 101*c*, the extracting means 101*d*, and the designating means 101*e* as described above can execute the afore-mentioned original function thereof by the processing unit 101's sequentially reading a program in accordance with the embodiment of the present invention, owned by the processing unit 101.

Operation of Embodiment

The operation of the diagnostic apparatus 100 in accordance with the embodiment of the present invention as shown in FIG. 1 is described in detail with the following operational examples with reference to FIG. 2 and below.

Operational Example 1

Figure 2:
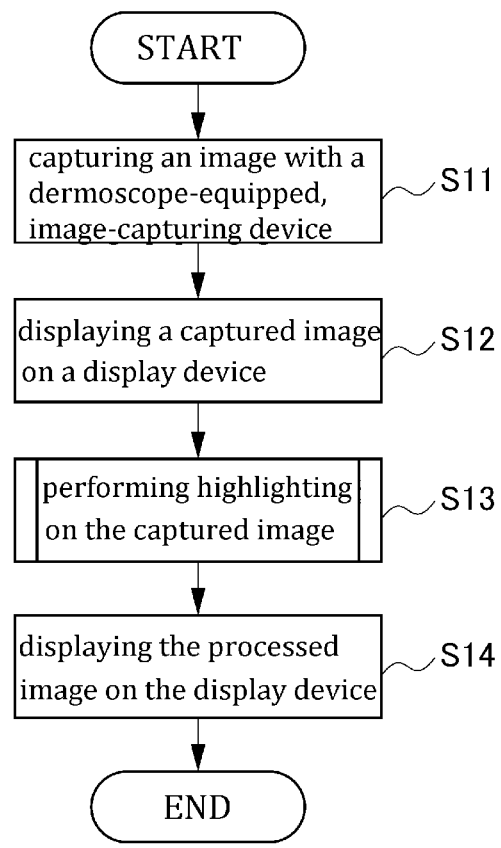
FIG. 2 is a flow chart illustrating a basic processing operation of operational example 1.

FIG. 2 depicts the flow of basic processing operation of operational example 1. Referring to FIG. 2, the processing unit 101 firstly acquires an image of an affected area (i.e., a skin legion) that is captured by the dermoscope-equipped, image-capturing device 110 (Step S11). Then, the captured image as acquired is memorized in the predetermined area of the image-memorizing unit 102, and is displayed on the display device 120 (Step S12). Subsequently, the processing unit 101 performs highlight process on the captured image (Step S13). The highlight-processed image and the captured image as previously displayed are displayed in parallel on the display device 120. Determination is left to a physician (Step S14).

Figure 5:
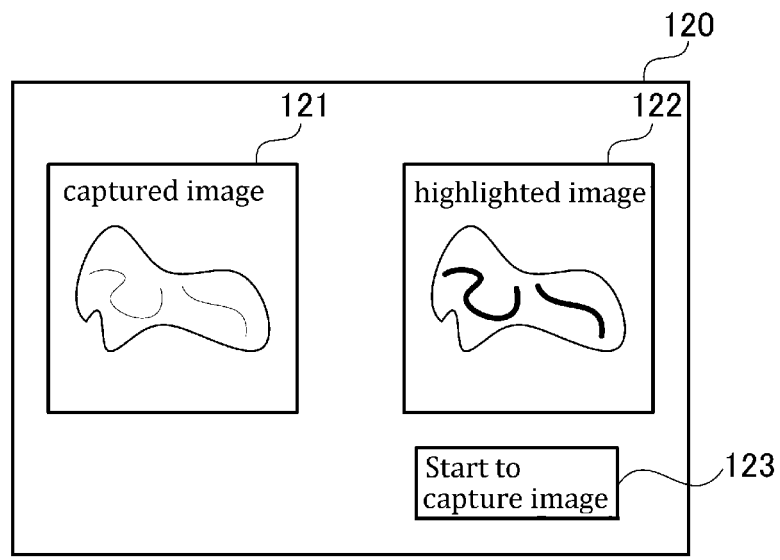
FIG. 5 shows an exemplary display screen configuration of a diagnostic apparatus of operational example 1.

An exemplary image of a display screen displayed on the display device 120 is shown in FIG. 5. In the screen of FIG. 5, a captured image-displaying section 121 is arranged at a left side and a highlighted image-displaying section 122 in which the highlighted image such as the highlighted image of vessel is shown is arranged at a right side. For example, upon the physician's clicking a button of "start to capture image" 123 which is located at a bottom right of the screen of the display device 120, the dermoscope-equipped, image-capturing device 110 starts to capture the image of the affected area. By the processing unit 101 the captured image and the highlighted image, for example, the highlighted image of vessel region, out of the captured images are respectively displayed in the sections 121 and 122 arranged in parallel.

Figure 3:
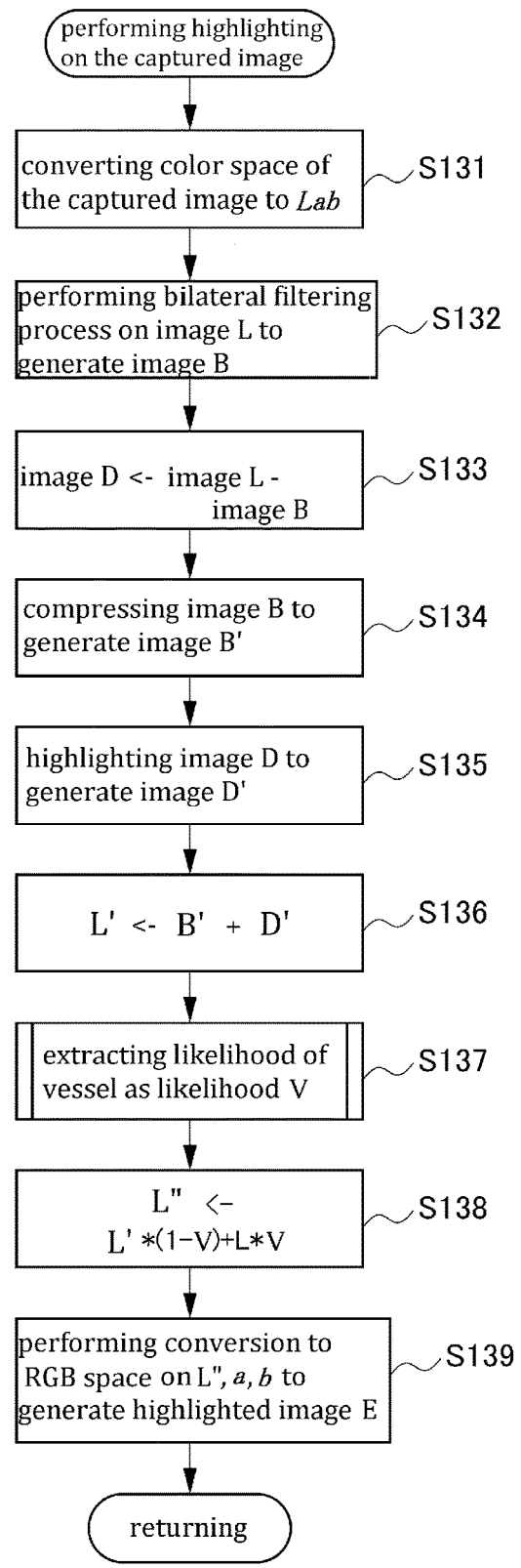
FIG. 3 is a flow chart illustrating an operation of highlighting a captured image in FIG. 2.

The details of the image-highlighting procedure as defined in Step S13 of FIG. 2 are shown in FIG. 3. In the embodiment, the processing unit 101 separates the captured image of the affected area (i.e., the skin disease), which is captured by the dermoscope-equipped, image-capturing device 110, into the component having glovally-varying properties and the component having locally-varying properties. The highlighting process is performed on the component having glovally-varying properties and the component having locally-varying properties in a different manner.

In order to this, the processing unit 101 firstly performs color space conversion. The processing unit 101, in particular the first separating means 101a, converts the captured image of RGB color space that is acquired by the dermoscope-equipped, image-capturing device 110 to the captured image of Lab color space (CIE 1976 L*a*b* color space) (Step S131). The details of the Lab color space are described in, for example, internet URL (http://Ja.wikipedia.org/wiki/Lab%E8%89%B2%E7%A9%BA%E9%96%93) (accessed on Sep. 1, 2014). Hereinafter, L, a and b of coordinate axes in the Lab color space are written in bold italics.

Subsequently, the second separating means 101b of the processing unit 101 use an image L corresponding to the brightness in the Lab color space so as to perform edge preserving filtering process, thereby causing the base component and the detail component to be separated from each other (Step S132). An edge preserving filter which can be used in this filtering process may be a bilateral filter. The details of the bilateral filter are described in, for example, internet URL (http://en.wikipedia.org/wiki/Bilateral filter) (accessed on Sep. 1, 2014).

Next, the processing unit 101 moves on to control of the highlighting means 101c. The highlighting means 101c acquire an image B (B=bilateral filter (L)) that is obtained by performing the bilateral filtering process on the image L. In this regard, the image B is the base component. Next, the highlighting means 101c acquire a detail component image D. The image D can be obtained by subtracting the image B from the image L (Step S133).

Subsequently, the highlighting means 101c generate an image B' corresponding to a compressed, base component image that is obtained by compressing the image B (Step S134). The image B' can be generated in accordance with the following mathematical formula: $B'=(B-C1)*K1+C1$. In above mathematical formula, the range of a L axis in the Lab color space is from 0 to 100, and the range of the image B processed by the bilateral filter is also limited to from 0 to 100. In this regard, C1 is a center location of compression and may be a value of, for example, 50. The coefficient K1 is a compression ratio, which may be, for example, 0.5. These value are only non-restrictive example. Here, "compressing the image B with the highlighting means 101c" is the same meaning as "attenuating the base component of the image B therewith".

Next, the highlighting means 101c generate a highlighted, detail component image D' that is obtained by performing highlighting process on the detail component image D (Step S135). The highlighted, detail component image D' is generated in accordance with the following mathematical formula: $D'=D*K2$. In above mathematical formula, K2 is a highlighting ratio, and may be a value of, for example, 3. Subsequently, the highlighting means 101c use the compressed image, the image B' and the highlighted image, the image D' so as to generate a brightness-highlighted image L' (Step S136). The brightness-highlighted image L' is generated in accordance with the following mathematical formula: $L'=B'+D'$. In the above mathematical formula, B' is the compressed, base component image, and D' is the highlighted, detail component image.

Furthermore, the brightness-highlighted image L' may be obtained by converting the brightness image L to a gradient space, and after gradient conversion per a pixel generating the brightness-highlighted image from the gradient space in accordance with Poisson's equation. In this regard, gradient G (x, y) can be represented by the following mathematical formula: $G(x, y)=(L(x+1y)-L(x, y), L(x, y+1)-(L(x, y))$. In the above mathematical formula, in a case where M is a conversion function, the gradient conversion can be performed in accordance with the following mathematical formula: $G'(x, y)=M(G(x, y), x, y)$. For example, non-linear processing can be performed to attenuate greater gradient. By resolving Poisson's equation: $\Delta L'=\text{div}(G')$, the converted brightness image (i.e., the brightness-highlighted image L') can be obtained. In the above equation, "$\Delta$" represents Laplace operator, and "div" represents a divergence of vector analysis.

Furthermore, highlighting based on a uniform conversion process, for example, via the following mathematical formula: brightness-highlighted image $L=\log(L)$ may be performed. Furthermore, the uniform conversion process may not be performed over the whole image, and conversion process may be performed on each divided section. In this case, the section may be manually or automatically set based on lightness and/or disease.

Figure 4:
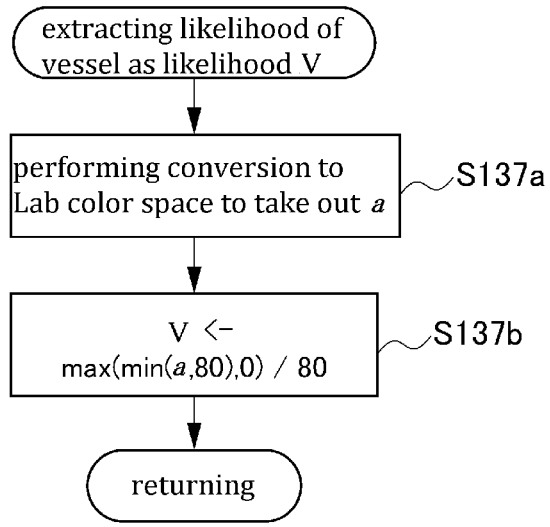
FIG. 4 is a flow chart illustrating an operation of extracting likeness of a vessel in FIG. 3.

Next, the highlighting means 101c extract likeness of vessel as a likelihood V (Step S137). In this regard, the likelihood V has the same number of element(s) as the brightness-highlighted image L' has, and each of elements is indicated by a value of a range of from 0 to 1. As the likeness of vessel increases, the value of element approaches 1. The procedure of extracting the likeness of vessel as the likelihood V will be described in detail with reference to FIG. 4. Referring to FIG. 4, the highlighting means 101c acquire the value of an a axis that corresponds to a direction of red-based color in Lab color space (Step S137a), and set the value of the likelihood V within the range of from 0 to 1 via normalization ($V \leftarrow \max(\min(\text{the value of the a axis, S)}, 0)/S$) with the limited range of from 0 to 80 (Step S137b). In the embodiment, the value of likelihood V is subjected to limitation of the value of from 0 to 80 by applying 80 to S. However, the above value is only non-restrictive example.

Returning to the flow chart of FIG. 3, after extracting the likeness of vessel as the likelihood V in Step S137, the highlighting means 101c determine the highlighted brightness L" (Step S138). The highlighted brightness L" can be determined in accordance with the following mathematical formula: $L''=L'*(1-V)+L*V$. In the above mathematical formula, a region of the likeness of vessel can be obtained by combining the brightness image L with the likelihood V, and a non-vascular region can be obtained by combining the highlighted image L' with the likelihood V. Furthermore, "*" represents multiplication per an element.

Next, the highlighting means 101c perform a conversion to the original RGB color space based on the obtained highlighted brightness L" and the a axis, the red-based color component, and a b axis, the blue-based color component so as to generate a highlighted image E (Step S139).

In accordance with operational example 1, the first separating means 101a of the processing unit 101 separate the captured image into the brightness component and the color information component; the second separating means 101b of the processing unit 101 separate the brightness component into the base component and the detail component; and the highlighting means 101c of the processing unit 101 perform the highlighting processes on the base component and the detail component in a different manner. As a result, as shown in, for example, FIG. 5 the captured image and the highlighted image in which the base component and the detail component of the captured image are subjected to different highlighting processes can be displayed in parallel in the captured image-displaying section 121 and the highlighted image-displaying section 122 respectively.

Operational Example 2

Figure 6:
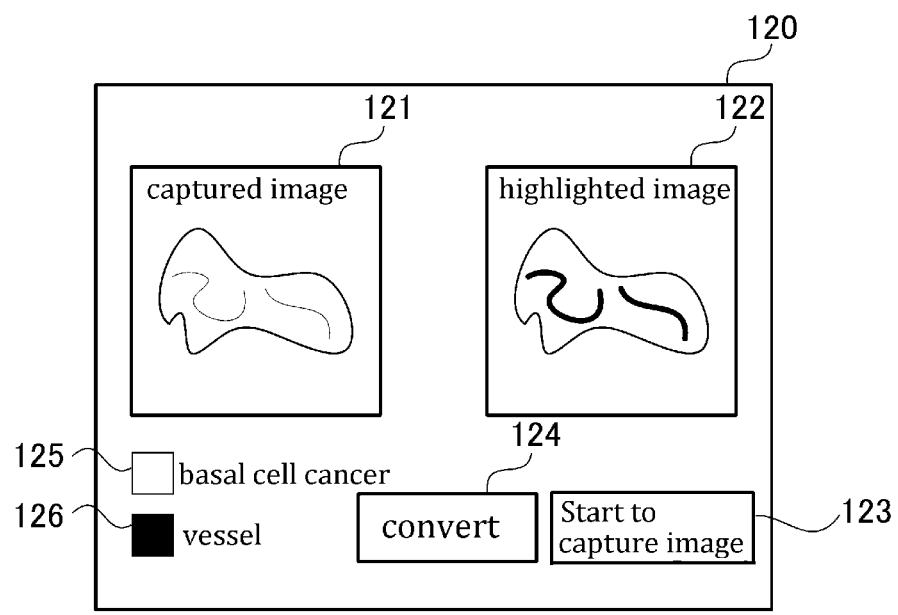
FIG. 6 shows an exemplary display screen configuration of a diagnostic apparatus of operational example 2.
Figure 7:
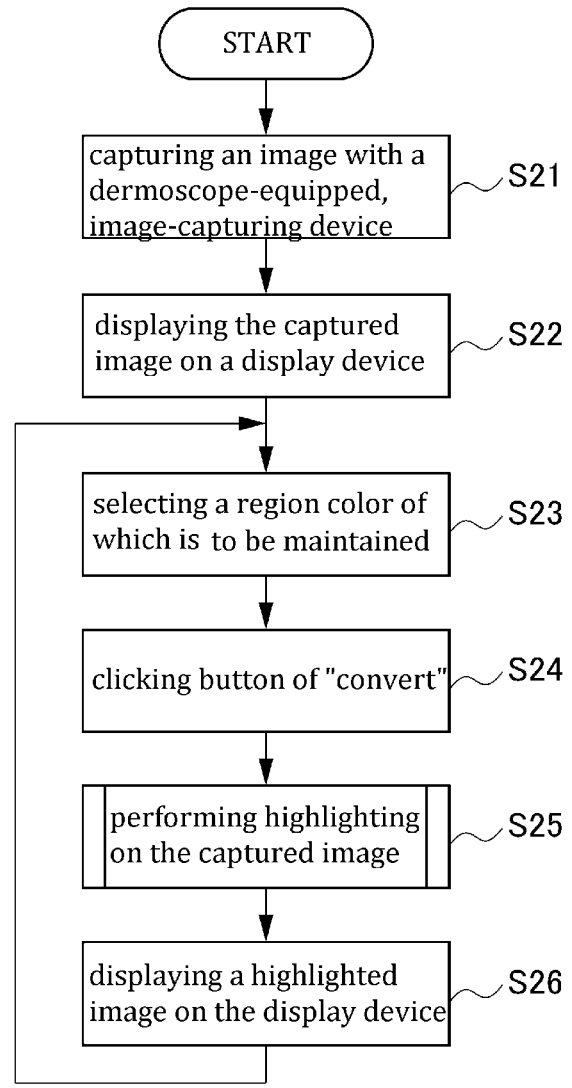
FIG. 7 is a flow chart illustrating a basic processing operation of the diagnostic apparatus of operational example 2.

Next, operational example 2 will be hereinafter described. FIG. 6 shows an exemplary display screen configuration of operational example 2. In operational example 2, a button of "convert" 124, a checkbox of "basal cell cancer" 125, and a checkbox of "vessel" 126 are added to the display screen configuration of operational example 1. FIG. 7 is a flow chart in which the basic processing operation of operational example 2 is illustrated.

Referring to FIG. 7, by the physician's clicking the button of "start to capture image" 123, a dermoscopic image is captured by the dermoscope-equipped, image-capturing device 110 (Step S21). The captured image is memorized in the image-memorizing unit 102 under the control of the processing unit 101, and displayed in the captured image-displaying section 121 of the display device 120 (Step S22).

Next, the physician operates with the input device 130 to select the region of which visual color is not desired to change (i.e., the region of which original color is to be maintained) (Step S23). Subsequently, when the physician operates the input device 130 to click the button of "convert" 124 (Step S24), the processing unit 101 (the highlighting means 101c) performs the highlighting process which will be described below (Step S25). The processed image obtained by the highlighting process is displayed in the highlighted image-displaying section 122 next to the captured image having been displayed in the captured image-displaying section 121 on the display device 120, as displayed in the same manner as operational example 1.

Figure 8:
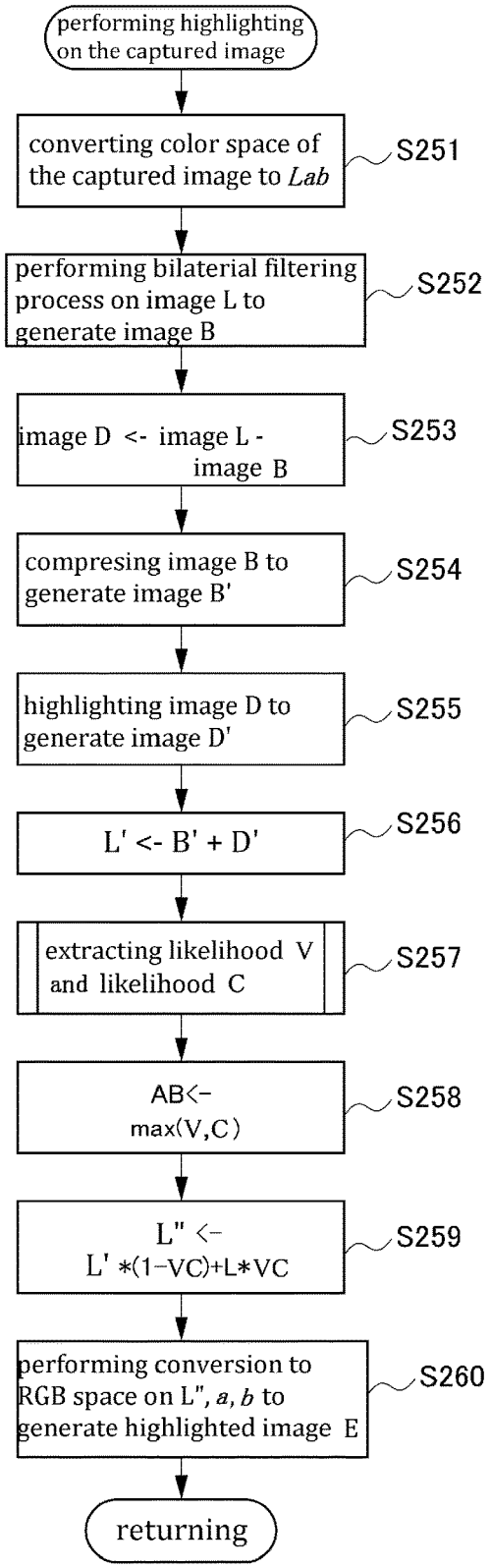
FIG. 8 is a flow chart illustrating an operation of highlighting a captured image in FIG. 7.

The step of "performing highlighting on the captured image" as indicated by Step S25 will be described in detail with reference to the flow chart of FIG. 8. As described with regard to operational example 1, the first separating means 101a of the processing unit 101 convert the captured image from the RGB color space to the Lab color space (Step S251). Then, the second separating device 101b of the processing unit 101 perform bilateral filtering process on the image L, which corresponds to the brightness, to generate the base component image B (Step S252). Since the subsequent procedure to generate the highlighted brightness image L' (Step S253-S256) can be performed in the same manner as operational example 1 shown in FIG. 3 (Step S133-S136), the detailed description in regard to the above procedure is omitted in order to avoid unnecessary overlap.

In operational example 2, after the highlighting means 101c of the processing unit 101 generate the highlighted brightness image L', the extracting means 101d of the processing unit 101 acquire the likeness of the selected region (in this embodiment, the likeness of vessel) as the likelihood V, and the likeness of basal cell cancer as the likelihood C, respectively (Step S257). A method of acquiring the likelihood V and the likelihood C using the extracting means 101d will be described below with reference to FIG. 9.

Subsequently, due to the extracting means 101d the likelihood VC can be determined by taking the maximum of each of the likeness of vessel (i.e., the likelihood V) and the likeness of basal cell cancer (i.e., the likelihood C) as obtained (Step S258: VC=max(V, C)). The highlighting means 101c determine the highlighted brightness L" (Step S259). In this regard, L" can be determined in accordance with the following mathematical formula: L"=L'*(1−VC)+ L*VC. Finally, as described in operational example 1, based on the highlighted brightness L", the a axis component, and the b axis component the conversion to the RGB color space is performed to generate the highlighted image E (Step S260).

Figure 9:
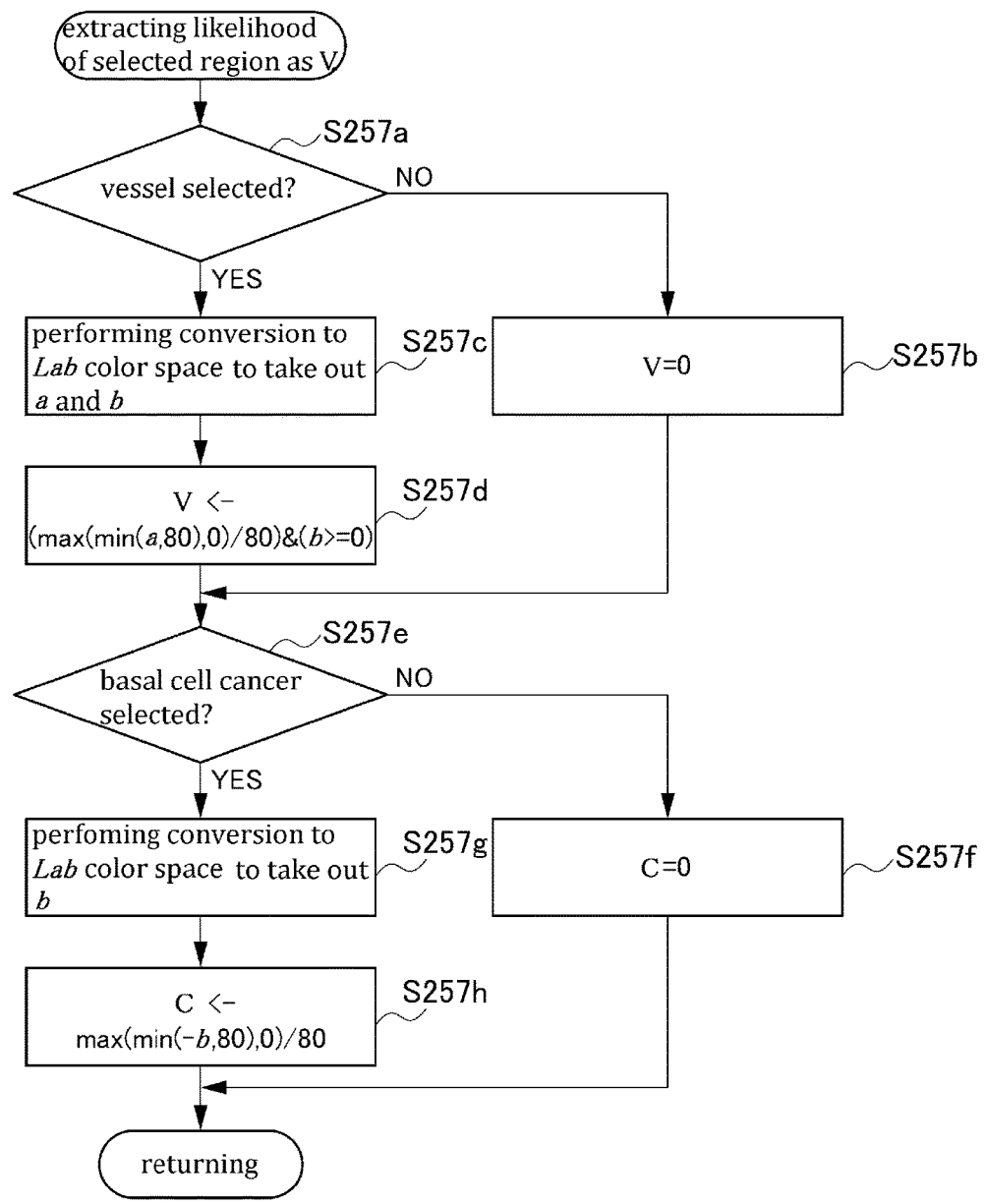
FIG. 9 is a flow chart illustrating an exemplary operation of extracting a selected region in FIG. 8.

The method of acquiring the likeness of vessel (i.e., the likelihood V) and the likeness of basal cell cancer (i.e., the likelihood C) using the extracting means 101d will be described below with reference to the flow chart of FIG. 9. If the vessel checkbox 127 located in the display screen as shown in FIG. 6 is not selected or check-marked ("NO" in Step S257a), the extracting means 101d set the likelihood V indicating the likeness of vessel at 0 (V=0) (Step S257b). On the other hand, if the vessel checkbox 127 of the display screen is selected or check-marked ("YES" in Step S257a), the a axis component and the b axis component of the Lab color space are taken out (Step S257c) to calculate the likeness of vessel (i.e., the likelihood V) (Step S257c). In this regard, the likeness of vessel (i.e., the likelihood V) can be determined in accordance with the following mathematical formula: V=max(min(the a axis component, 80), 0)/80 (wherein the b axis component is 0 or above). Normalization can be performed with the proviso that if the likelihood V is below 0, V is 0, and if the b axis component is 0 or above, the a axis color component is limited to a range of from 0 to 80 (Step S257d).

Subsequently, the extracting means 101d determine the state of the "basal cell cancer" checkbox displayed on the display screen as shown in FIG. 6 (Step S257e). In this regard, if the "basal cell cancer" checkbox 126 is not selected or check-marked "NO" in Step S257e), the extracting means 101d set the likelihood C at 0 (C=0) (Step S257f). If the "basal cell cancer" checkbox 126 is checked or selected ("YES" in Step 257e), the extracting means 101d perform conversion to the Lab color space and invert the sign of the b axis component (Step S257g). Then, due to the extracting means 101d the normalization is performed with a value of the limited range of from 0 to 80 so as to obtain the likeness of basal cell cancer (i.e., the likelihood C) with a range of from 0 to 1 (Step S257h).

In this embodiment, when obtaining the likeness of vessel (i.e., the likelihood V) and the likeness of basal cell cancer (i.e., the likelihood C), the specific values are indicated. However, theses specific values are non-restrictive.

In accordance with operational example 2, the processing unit 101 performs the processing such that the first separating means 101a separate the captured image into the brightness component and the color information component; the second separating means 101b separate the brightness component into the base component and the detail component; the highlighting means 101c highlight the base component and the detail component in a different manner; and the extracting means 101d extract the region selected as the object to be diagnosed based on the color information of the specified color. As a result, for example, as shown in the display screen of FIG. 6, the captured image and the highlighted image where the region selected as the object to be diagnosed is extracted based on the specified color are displayed in parallel on the display device 120.

In operational example 2, the highlighting means 101c highlight the red-based color component or the blue-based color component as the color information component of the specified color. In the former case, the extracting means 101d extract the selected region as the vessel-corresponding region based on the red-based color component. In the latter case, the extracting means 101d extract the selected region as the basal cell cancer-corresponding region based on the blue-based color component.

Operational Example 3

Figure 10:
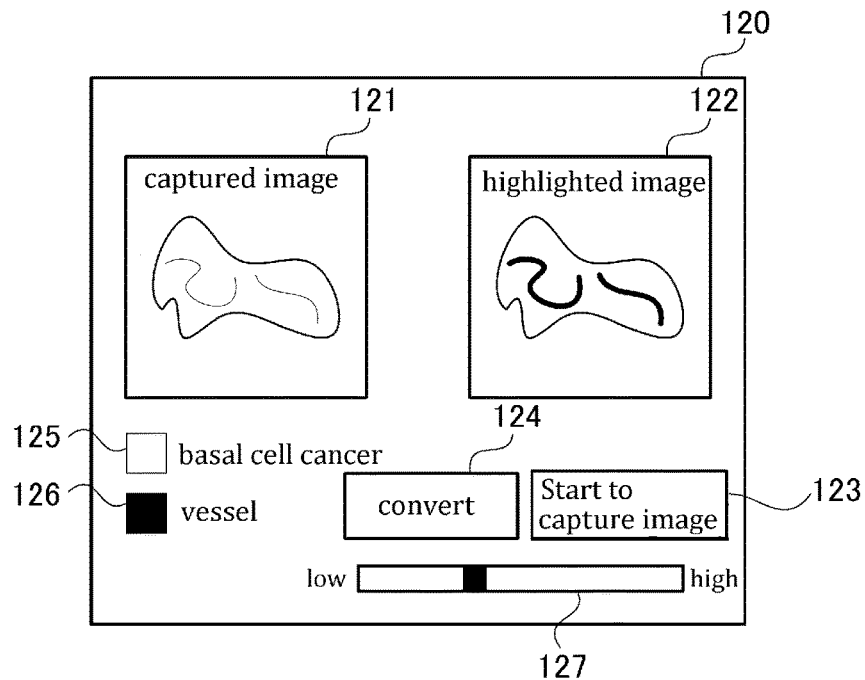
FIG. 10 shows an exemplary display screen configuration of a diagnostic apparatus of operational example 3.

Next, operational example 3 is described. FIG. 10 shows an exemplary display screen configuration. In operational example 3, a slide bar 127 designating the degree of maintaining the specified color is added to the display screen of FIG. 6 (operational example 2). If the slide bar 127 is set to the left, the degree of maintaining the specified color become weak. On the other hand, if the slide bar 127 is set to the right, the degree of maintaining the specified color become strong. In other words, when the slide bar 127 is set at its leftmost position, the sharpness of the region of the specified color increases. As the slide bar 127 is set to the right, the sharpness is gradually lost. Furthermore, maintaining the color contradicts the sharpness (i.e., clarity).

Figure 11:
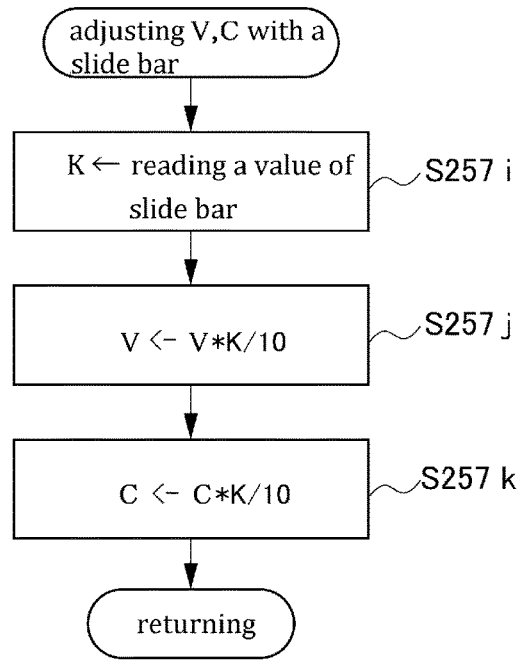
FIG. 11 is a flow chart illustrating an operation of adjusting a degree of a specified color as mentioned in operational example 3.

FIG. 11 shows the procedure of adjusting the degree of the specified color using the slide bar 127. The flow chart of FIG. 11 follows the process of extracting the likeness of basal cell cancer as the likelihood C (Step S257*h*) as shown in FIG. 9 with regard to operational example 2.

Referring to FIG. 10 in which the exemplary display screen is shown, when due to the processing unit 101 the captured image and the highlighted image in which the region selected as the object to be diagnosed is extracted based on the specified color are displayed in parallel in the captured image-displaying section 121 and the highlighted image-displaying section 122 respectively, the physician operates with the slide bar 127 to designate the degree of maintaining the specified color while checking the screen. Then, as shown in FIG. 11 in which the processing operation is shown, the designating means 101*e* read a value K indicated by the slide bar 127 (Step S257*i*). In this embodiment, the slide bar 127 has the value of a range of from 1 to 10. When the slide bar 127 is located at its leftmost position, the value K is 1. When the slide bar 127 is located at its rightmost position, the value K is 10.

Accordingly, the designating means 101*e* can reflect the value indicated by the slide bar 127 in the value of the likeness of vessel (i.e., the likelihood V) or the likeness of basal cell cancer (i.e., the likelihood C) extracted by the extracting means 101*d* to update the value of the likelihood V or B in conformity with the value of the slide bar 127. In other word, the designating means 101*e* variably designate the degree of maintaining the specified color based on contrast strength. Furthermore, the likeness of vessel (i.e., the likelihood V) can be determined in accordance with the following mathematical formula: $V=V*K/10$ and the likeness of basal cell line (i.e., the likelihood C) can be determined in accordance with the following mathematical formula: $C=C*K/10$ (Step S257*j*, Step S257*k*).

Finally, the highlighting means 101*c* generate the highlighted image using the likeness of vessel (i.e., the likelihood V) and the likeness of basal cell line (i.e., the likelihood C). The highlighted image can be generated in a similar manner as shown in FIG. 3 (operational example 1) and FIG. 8 (operational example 2). While in operational example 3 the coefficient K is obtained using the slide bar 127, it can be predetermined depending on a case. Furthermore, it is considered that the case is set in, for example, a checkbox (not shown).

In accordance with operational example 3, the first separating means 101*a* of the processing unit 101 separate the captured image into the brightness component and the color information component; the second separating means 101*b* of the processing unit 101 separate the brightness component into the base component and the detail component; the highlighting means 101*c* of the processing unit 101 perform the highlighting process on the base component and the detail component in a different manner; and the extracting means 101*d* of the processing unit 101 extract the region selected as the object to be diagnosed based on the color information of the specified color. The designating means 101*e* perform the process of variably designating the degree of maintaining the specified color based on the contrast strength. As a result, as shown in the display screen of FIG. 10, the captured image and the highlighted image in which the region selected as the object to be diagnosed is extracted based on the specified color are displayed in parallel on the display device 120. In this regard, by the operation with the slide bar 127, the degree (ratio) of maintaining the specified color can be variably set based on the contrast strength. In other word, when the degree is relatively high, the specified color is relatively maintained on the display screen. On the other hand, when the degree is relatively low, the contrast is highlighted while failing to maintain the visual color. As such, more dynamically flexible display can be realized depending on an objective of diagnosis.

Effect of Embodiment

In accordance with the diagnostic apparatus 100 directed to one embodiment of the present invention, due to the processing unit 101 the highlighted image in which the region to be diagnosed is highlighted with the specified color thereof maintained is displayed on the display device 120. Accordingly, the physician can easily and correctly make a diagnosis only by checking the display screen, thereby improving diagnostic accuracy. Furthermore, the processing unit 101 separates the captured image memorized in the image-memorizing unit 102 into the brightness component and the color information component; separates the brightness component into the base component and the detail component; and performs the highlight process on the base component and the detail component in a different manner. For the reasons, the physician can visually check the highlighted image of the selected region depending on an objective of diagnosis. Furthermore, the region selected as the object to be diagnosed is extracted based on the color information of the specified color and the ratio of the specified color in the selected region is variably designated, thereby causing appearance to be flexibly varied. As a result, the physician can even more easily and correctly make a diagnosis, thereby further improving diagnostic accuracy.

In accordance with the diagnostic device 100 directed to one embodiment of the present invention, by the bilateral filtering process or the bilateral filter the brightness component is separated into the base component and the detail component. However, in addition to the bilateral filter other edge preserving smoothing filter such as an epsilon filter can be also used. Furthermore, while in the embodiment the captured image and the highlighted image are displayed in parallel, the same effect can be attained by switching and displaying the captured image/the highlighted image on the same screen.

The above embodiments and operational examples are given to illustrate the scope and spirit of the instant invention. These embodiments and operational examples will make apparent, to those skilled in the art, other embodiments and examples. These other embodiments and examples are within the contemplation of the present invention. Therefore, the instant invention should be limited only by the appended claims.

100 . . . diagnostic apparatus; 101 . . . processing unit; 101a . . . first separating means; 101b . . . second separating means; 101c . . . highlighting means; 101d . . . extracting means; 101e . . . designating means; 110 . . . dermoscope-equipped, image-capturing device; 120 . . . display device; 121 . . . captured image-displaying section; 122 . . . highlight image-displaying section; 123 . . . button of "start to capture image"; 124 . . . button of "convert"; 125 . . . checkbox of "basal cell cancer"; 126 . . . checkbox of "vessel"; 127 . . . slide bar; 130 . . . input device

What is claimed is:

1. A diagnostic apparatus for diagnosing a disease using a captured image of an affected area, the apparatus comprising:
    a memory configured to store the captured image; and
    a processor configured to process the captured image stored in the memory,
    wherein the processor is configured to perform operations including:
    separating the captured image into a brightness component and a color information component by converting the captured image from RGB color space to Lab color space;
    highlighting the brightness component;
    determining a likelihood representing a likeness of a region to be diagnosed based on a specified color component representing the region;
    generating a highlighted brightness image based on the highlighted brightness component and the likelihood representing the likeness of the region to be diagnosed; and
    generating a highlighted color image in which a specified color corresponding to the specified color component is maintained by converting the generated highlighted brightness image and the color information component from Lab color space to RGB color space.

2. The diagnostic apparatus according to claim 1, wherein the region is a vessel-corresponding region,
    wherein the determining the likelihood comprising determining a likelihood representing a likeness of a vessel based on a red-based component as the specified color component, and
    wherein the generating the highlighted brightness image comprises generating a highlighted image based on the highlighted brightness component and the likelihood representing the likeness of a vessel.

3. The diagnostic apparatus according to claim 1, wherein the highlighted brightness image is generated in accordance with the following formula:

$$L''=L'*(1-V)+L*V$$

where:
L" is the highlighted brightness image,
L' is the highlighted brightness component,
L is the brightness component, and
V is the likelihood representing the likeness of the region to be diagnosed.

4. The diagnostic apparatus according to claim 1, wherein the operations performed by the processor further include displaying the captured image and the highlighted color image side by side on a display.

5. The diagnostic apparatus according to claim 1, wherein the operations performed by the processor further include separating the brightness component into a base component having globally-varying properties statistically and a detail component having locally-varying properties statistically, and
    wherein the highlighting the brightness component comprises highlighting on the base component and the detail component respectively and composing the highlighted base component and the highlighted detail component to generate the highlighted brightness component.

6. The diagnostic apparatus according to claim 1, wherein the region is a basal cell cancer corresponding region, and
    wherein the determining the likelihood comprises determining a likelihood representing a likeness of a basal cell cancer based on a blue-based component in the color information component as the specified color component.

7. The diagnostic apparatus according to claim 1, wherein the operations performed by the processor further include selecting the region corresponding to the specified color to be maintained, and
    wherein the generating the highlighted color image comprises generating the highlighted color image using a likelihood representing a likeness of a basal cell cancer when the selected region is a basal cell cancer and generating the highlighted color image using a likelihood representing a likeness of a vessel when the selected region is a vessel.

8. The diagnostic apparatus according to claim 1, wherein the operations performed by the processor further include variably designating a degree of maintaining the specified color of the region, and
    wherein as the degree of maintaining the specified color increases, the specified color is more accurately maintained.

9. A method of processing an image in a diagnostic apparatus for diagnosing a disease using a captured image of an affected area, the method comprising:
    separating the captured image into a brightness component and a color information component by converting the captured image from RGB color space to Lab color space;
    highlighting the brightness component;
    determining a likelihood representing a likeness of a region to be diagnosed based on a specified color component representing the region;
    generating a highlighted brightness image based on the highlighted brightness component and the likelihood representing the likeness of the region to be diagnosed; and
    generating a highlighted color image in which a specified color corresponding to the specified color component is maintained by converting the generated highlighted brightness image and the color information component from Lab color space to RGB color space.

10. A non-transitory computer readable medium storing a program for processing an image in a diagnostic apparatus for diagnosing a disease using a captured image of an affected area, the program being executable by a computer of the diagnostic apparatus to perform operations including:
    separating the captured image into a brightness component and a color information component by converting the captured image from RGB color space to Lab color space;
    highlighting the brightness component;
    determining a likelihood representing a likeness of a region to be diagnosed based on a specified color component representing the region;

generating a highlighted brightness image based on the highlighted brightness component and the likelihood representing the likeness of the region to be diagnosed; and generating a highlighted color image in which a specified color corresponding to the specified color component is maintained by converting the generated highlighted brightness image and the color information component from Lab color space to RGB color space.

* * * * *